(No Model.) 3 Sheets—Sheet 1.

G. PRAETORIUS.
Apparatus for Cooling, Disinfecting, Perfuming, &c.

No. 235,960. Patented Dec. 28, 1880.

Witnesses:
A^m Lyons
Henry VanBlarcom

Inventor:
Georg Praetorius
per Henry E. Roeder
Attorney (No Model.) 3 Sheets—Sheet 2.
G. PRAETORIUS.
Apparatus for Cooling, Disinfecting, Perfuming, &c.
No. 235,960. Patented Dec. 28, 1880.
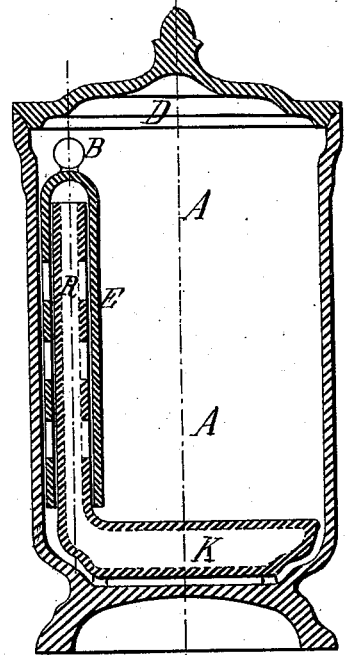
Fig. 6.
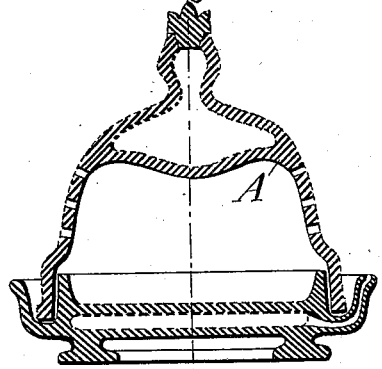
Fig. 8.
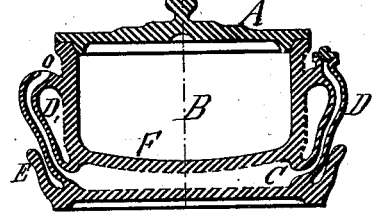
Fig. 7.
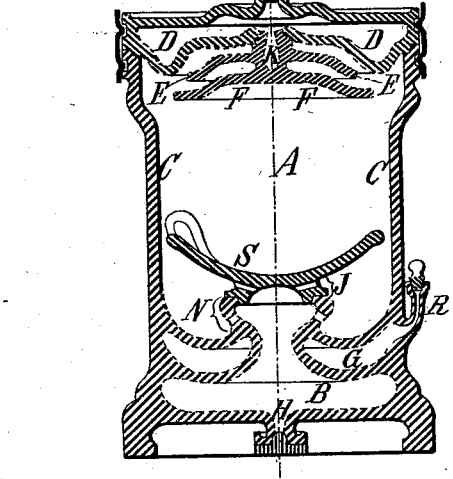
Fig. 9.
Fig. 10.
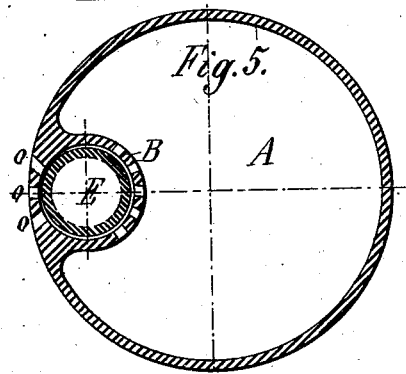
Fig. 5.
Witnesses:
Wm. Lyons
Henry Van Marcom
Inventor:
Georg Praetorius
per Henry E. Roeder
Attorney
N. PETERS, PHOTO-LITHOGRAPHER, WASHINGTON, D.C.

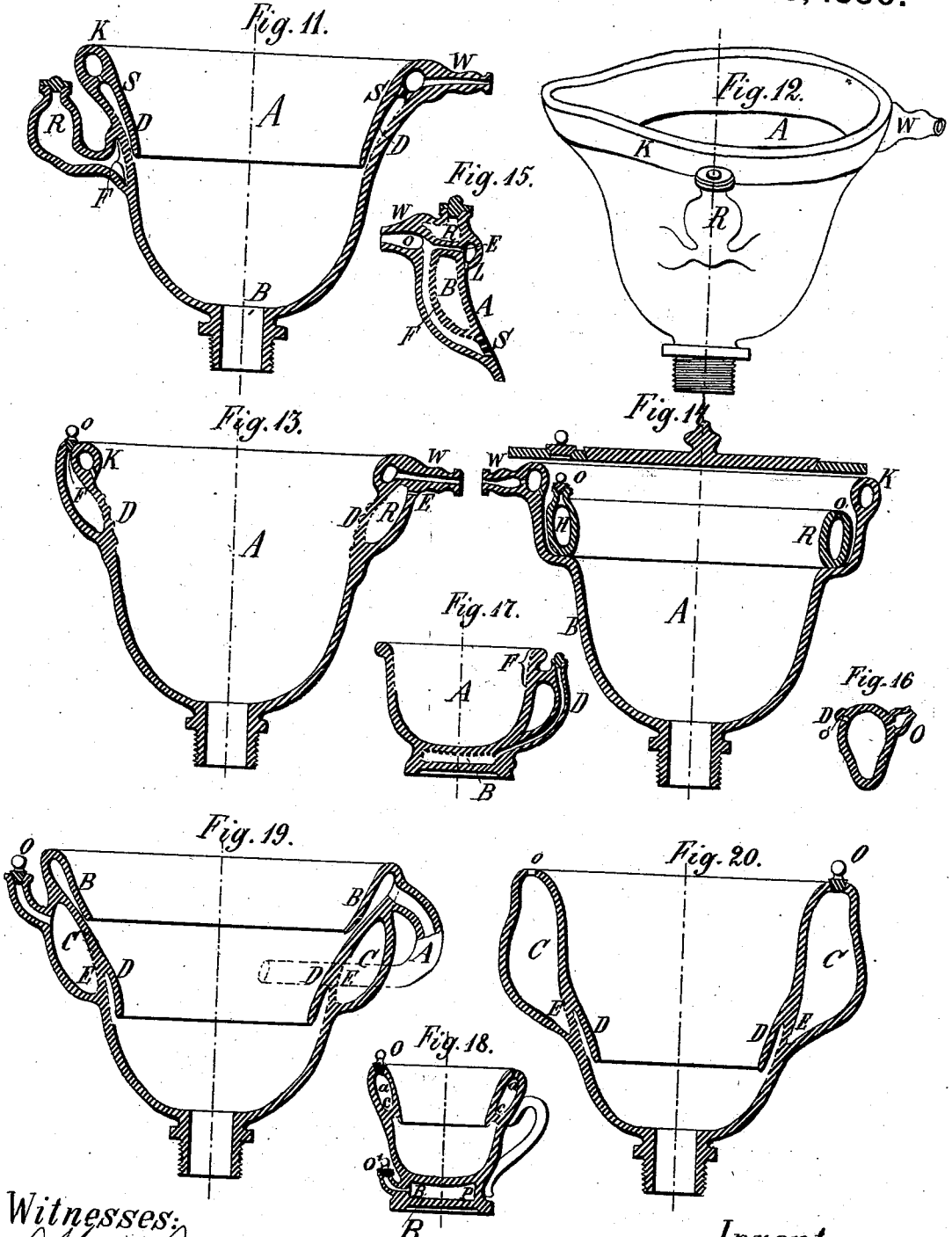

UNITED STATES PATENT OFFICE.

GEORG PRAETORIUS, OF BRESLAU, PRUSSIA, GERMANY.

APPARATUS FOR COOLING, DISINFECTING, PERFUMING, &c.

SPECIFICATION forming part of Letters Patent No. 235,960, dated December 28, 1880.

Application filed May 20, 1880. (No model.)

*To all whom it may concern:*

Be it known that I, GEORG PRAETORIUS, of Breslau, Province of Silesia, Kingdom of Prussia, Empire of Germany, have invented certain new and useful Improvements in Devices for Filtering, Cooling, and Similar Purposes, of which the following is a specification, reference being had to the accompanying drawings.

Figure 1:
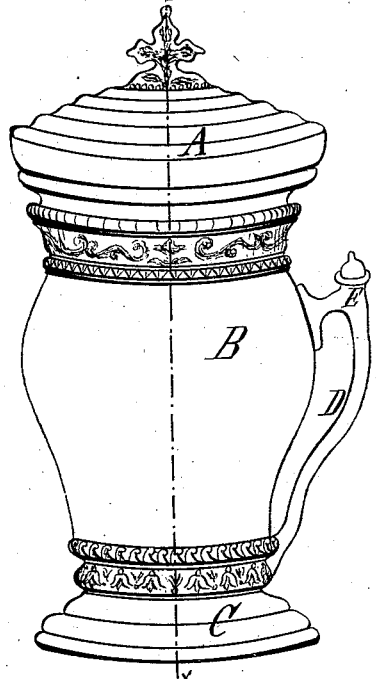
Figure 2:
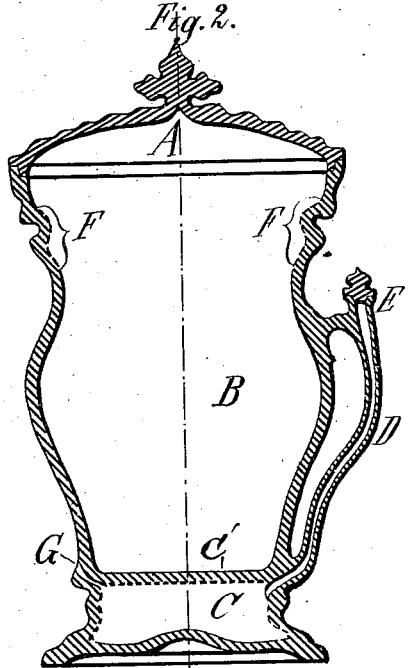
Figure 3:
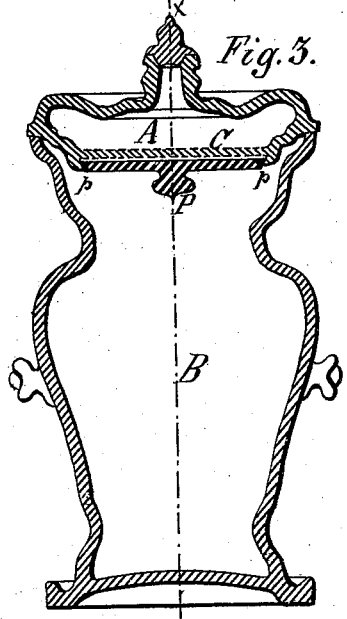
Figure 4:
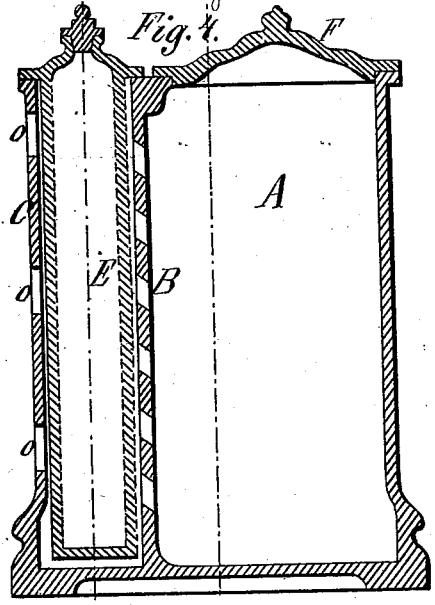

Figure 1 of said drawings represents a side elevation of a jar for cooling and moistening tobacco. Fig. 2 represents a vertical section through the same. Fig. 3 represents another vertical section of the same on the lines $xx$ of Fig. 1 and $yy$ of Fig. 2. Fig. 4 represents a vertical section of a modification. Fig. 5 represents a horizontal section through the latter. Fig. 6 represents a vertical section of another modification. Figs. 7 and 8 represent vertical sections through two dishes or receptacles for containing and cooling butter or other substances. Fig. 9 represents an ice-holder or refrigerator in vertical section. Fig. 10 represents a vertical section of an evaporating apparatus. Figs. 11 to 20 represent different forms of water-closets and chambers, in vertical section, embodying my invention.

In all the devices hereinbefore referred to a portion is glazed or otherwise made impervious to water, while certain other portions are left unglazed or porous. The unglazed portions are indicated by dotted lines.

In Figs. 1 and 2, A designates the cover; B, the hollow body of the vessel; C, the hollow base of the latter, and D the hollow handle of said vessel or jar. All parts are preferably made of earthenware. The base C is separated from the body B by a horizontal partition, C', of unglazed earthenware. There is also an annular unglazed part, F, in the upper part of the material composing the body B. The remainder of the jar is glazed within and without, except the walls of hollow base C. The upper part of arm D has an inlet, which is closed by a stopper, E. Hollow base C is provided with an air-outlet, G. The tobacco is placed within body B, and water is then supplied through handle D to base C. This water percolates up through partition C', and after moistening the tobacco evaporates through unglazed annular part F. This evaporation cools the tobacco.

Fig. 3 shows a hollow body, B, for receiving the tobacco, and a hollow cover, A, for containing water. This cover has an unglazed bottom, C, through which moisture passes to the tobacco below. It has also a flange, $p$, below said bottom, constructed to retain a glazed bottom, P, having an edge of hardened india-rubber. When the tobacco is moistened enough the plate or bottom P is put into its place below unglazed bottom C, cutting off all further supply.

Fig. 7 shows a butter-dish, B, having a detachable cover, A, a hollow base, C, and hollow arms D, communicating with the interior of said base. One of these arms is provided with an opening, $o$, for supplying water, and the bottom of butter-dish B is left unglazed, so as to allow the water to rise and cool the butter. The handles D are left unglazed to facilitate evaporation.

Fig. 8 shows a similar construction, except that the cover is perforated and partly unglazed, it also being shaped so as to take the place of the sides of the dish. The base is hollow and saucer-shaped, and provided with two concentric annular flanges, between which the cover sits. The outer flange has an inlet-passage communicating with the hollow of said base for the supply of water.

In Fig. 10, S indicates a cup or saucer for holding articles which are to be subjected to the action of vapors in chamber A. G designates a hollow porous base supporting the same, and adapted to be supplied with liquid through inlet R. E F designate vaporizing-plates suspended from the cover D. A hollow space, B, below G, may receive additional material, such as sulphuric acid. Such additional material may act as an absorbent of vapor or as a generator of vapor.

In Fig. 17 a chamber-pot is shown constructed after the manner of the receptacle in Figs. 1 and 2. The hollow base B may be supplied with disinfecting-fluid through the handle, and this fluid will rise into the chamber through the unglazed bottom thereof. Vapors will pass off through unglazed part F when the cover is on.

The other figures on Sheet 3 show modifications of this construction embodying the same general principle.

It is not new to make an earthenware vessel with a glazed portion and an unglazed detachable compartment. I do not claim such construction.

What I claim is—

An earthenware vessel consisting of two chambers with an unglazed partition between them, forming a permanent part of the said vessel, as set forth.

In testimony thereof I have signed this specification in the presence of two subscribing witnesses.

DR. GEORG PRAETORIUS.

Witnesses:
 FRANZ STRYSREK,
 CARL PRAETORIUS.